United States Patent [19]
Decker, Jr.

[11] Patent Number: 5,951,302
[45] Date of Patent: Sep. 14, 1999

[54] VOICE-OVER INSTRUCTIONAL SYSTEM AND METHOD OF VOICE-OVER INSTRUCTION

[76] Inventor: Nelson Joseph Decker, Jr., 718 Carol Marie, Baton Rouge, La. 70806-5615

[21] Appl. No.: 08/692,452

[22] Filed: Aug. 5, 1996

[51] Int. Cl.⁶ .................................................... G09B 5/00
[52] U.S. Cl. .......................... 434/308; 434/156; 434/185; 434/307 R
[58] Field of Search .................................... 434/156, 157, 434/169, 185, 238, 307 R–312, 316, 318–322, 362, 365; 348/7, 13; 345/302; 84/470 R, 601–610; 704/257, 277

[56] References Cited

U.S. PATENT DOCUMENTS

| | | |
|---|---|---|
| 2,153,027 | 4/1939 | Ross . |
| 2,416,353 | 2/1947 | Shipman et al. . |
| 3,662,121 | 5/1972 | Cruger ................................. 434/320 X |
| 3,733,719 | 5/1973 | Ley . |
| 3,765,106 | 10/1973 | Cornell, III ............................. 434/320 |
| 3,955,466 | 5/1976 | Goldmark ............................ 434/319 X |
| 4,177,708 | 12/1979 | Pinz et al. . |
| 4,354,841 | 10/1982 | Meeder ................................ 434/319 X |
| 4,380,438 | 4/1983 | Okamoto .............................. 434/320 X |
| 4,459,114 | 7/1984 | Barwick .............................. 434/307 R |
| 4,615,680 | 10/1986 | Tomatis ................................ 434/185 X |
| 5,052,264 | 10/1991 | Dueweke . |
| 5,183,398 | 2/1993 | Monte et al. . |
| 5,294,745 | 3/1994 | Yamauchi et al. . |
| 5,439,382 | 8/1995 | Pettinichi . |
| 5,569,038 | 10/1996 | Tubman et al. ......................... 434/308 |
| 5,746,601 | 5/1998 | Yoon .................................. 434/320 X |
| 5,748,841 | 5/1998 | Morin et al. ............................. 704/257 |
| 5,810,598 | 9/1998 | Wakamoto .......................... 434/185 X |
| 5,810,599 | 9/1998 | Bishop ............................ 434/307 R X |
| 5,810,600 | 9/1998 | Okada .................................... 434/185 |

Primary Examiner—Joe H. Cheng
Attorney, Agent, or Firm—Joseph N. Breaux

[57] ABSTRACT

A voice-over instructional system comprising an instructional recording having a plurality of completed works, each completed work including an example section as an example for the student to follow, and a performance section consisting of a background-only track; and a script including the words and director's notes for each of the plurality of works. The performance section preferably immediately follows the example section for each work. It is also preferable to divide the recording into separate works including a first selection that includes both the example section and the performance section; and a second selection immediately following the first selection having only the performance section for the work. In a second aspect of the invention a voice-over instruction method is provided that utilizes the voice-over instructional system.

1 Claim, 2 Drawing Sheets

5,951,302

VOICE-OVER INSTRUCTIONAL SYSTEM AND METHOD OF VOICE-OVER INSTRUCTION

TECHNICAL FIELD

The present invention relates to instructional aids and methods for instructing individuals in the art of voice-over performance, technique and skills and more particularly to an instructional system including an instructional recording having a plurality of recorded selections of voice-over examples and a like plurality of identical performance sections consisting of recordings of each voice-over example in combination with written instructional material containing a script of each voice-over example, including director's notes, and a recording mechanism for simultaneously recording the background-only recording and the students performance to teach a variety of voice-over techniques and to allow the student to listen to and critique his/her performance; and a method of teaching voice-over technique utilizing the instructional system of the present invention.

BACKGROUND OF THE INVENTION

Voice-over recording makes up a large portion of the recording work performed. Voice-overs are performed in all types of television and radio commercials, as well as, portions of television and film programs and other artistic and instructional works. Because a performer skilled in voice-over performance has a greater chance of finding employment in the television and film industries, it would be a benefit to have a self-administered voice-over instructional system that allowed a person to gain performance skills and confidence without the necessity of expensive instructors or access to expensive recording studios and equipment. Because personal instruction is expensive, it would be a further benefit to have a voice-over instructional system that was inexpensive to produce and purchase and included at least one instructional recording having a plurality of completed works, each completed work including an example section consisting of a background-only track mixed with a track containing a professional performance of the voice-over part to be learned as an example for the student to follow, and a performance section consisting of a background-only track for the student to play in conjunction with practicing his/her performance.

Because listening to the performance while it is occurring is difficult, it would be a further benefit to the student if the voice-over instructional system included a mechanism for recording the student's performance of the voice-over exercises to allow for self-critiquing of the performance by the student. In addition, because the writers and directors of works requiring voice-overs, such as commercials, documentaries, etc., often provide written instructions and notes to the performer about how the voice-over should be performed, it would be a further benefit to have a voice-over instructional system that included such written instructions and notes for the student to attempt to follow incorporated into the scripts. It would, of course, also be a benefit, to have a method of voice-over instruction that was effective as a self-study course.

SUMMARY OF THE INVENTION

It is thus an object of the invention to provide a method of voice-over instruction that is self-administered.

It is a further object of the invention to provide a voice-over instructional system that allows a person to gain voice-over performance skills and confidence without the necessity of expensive instructors or access to expensive recording studios and equipment.

It is a still further object of the invention to provide a voice-over instructional system that is inexpensive to produce and includes at least one instructional recording having a plurality of completed works, each work including an example section consisting of a background track mixed with a track containing a professional performance of the voice-over part to be learned, used as an example for the student to follow, and a performance section consisting of a background-only track for the student to play in conjunction with practicing his/her performance.

It is a still further object of the invention to provide a voice-over instructional system that includes a mechanism for allowing the student to record his/her performance of the voice-over exercises to allow for self-critiquing of the performance by the student or submission of the recording as a demonstration tape when seeking voice-over employment.

It is a still further object of the invention to provide a voice-over instructional system that includes scripts containing written instructions and notes to the student about how the voice-over should be performed.

It is a still further object of the invention to provide a voice-over instructional system that accomplishes all or some of the above objects in combination.

Accordingly, in a first aspect of the invention a voice-over instructional system is provided. The voice-over instructional system comprises an instructional recording having a plurality of completed works, each completed work including an example section consisting of a background track mixed with a track containing a professional performance of a voice-over part, and a performance section consisting of a background-only track; and a script including the words and director's notes for each of the plurality of works. The term "background-only" as used herein means an audio recording containing audio of music, other voices, or sound effects. The performance section preferably immediately follows the example section for each work. It is also preferable to include a slate before the example section and/or the performance section. The term "slate" as used herein means a section of audio recording containing a description of the work, such as a title, and a countdown sequence, such as five, four, three, two, one, to cue the student.

The recording can be divided into separate works including a first selection that includes the example section followed by the performance section; and a second selection including the performance section. This allows the student to repeatedly play the first selection containing the example section and the performance section to familiarize him/herself with the work and the manner in which the voice-over is to be delivered. Once the student is familiar with the work and the manner of delivery, the student can then repeat the second selection over and over to practice or record the performance as desired. The first and second selections are separated by selection I.D. codes.

The system also preferably includes a recording system having a recording playback mechanism; a recording mechanism that is capable of recording simultaneously from the recording playback mechanism and a microphone onto a recording medium; and a microphone. A supply of recording media, such as audio cassette recording tape, can also be provided with the system if desired. The system also preferably includes a repeat function included with the recording playback mechanism to allow an individual selection to be repeated a number of times automatically.

It should be understood that the instructional recording can be recorded in any format, however, it is preferably recorded on a compact disk to allow the student to rapidly repeat the example section and/or the performance section on which he/she is practicing. In a second aspect of the invention a voice-over instruction method is provided. The instruction method comprises the steps of 1) providing an instructional recording as previously described; 2) providing a recording system including a recording playback mechanism, a recording mechanism that is capable of recording simultaneously onto a recording medium the recording played by the playback mechanism and the signal from a microphone, and a microphone; 3) providing a recording medium; 4) positioning the instructional recording into the recording playback mechanism; 5) positioning the recording medium into the recording mechanism; 6) activating the recording playback mechanism to play a selection from the recording; 7) providing a script of each work included on the instructional recording; 8) activating the recording mechanism; and 9) performing the script into the microphone while both the recording mechanism and the recording playback mechanism are in operation. In a preferred method the instructional recording provided is divided into works including a first selection that includes the example section followed by the performance section; and a second selection including the performance section.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
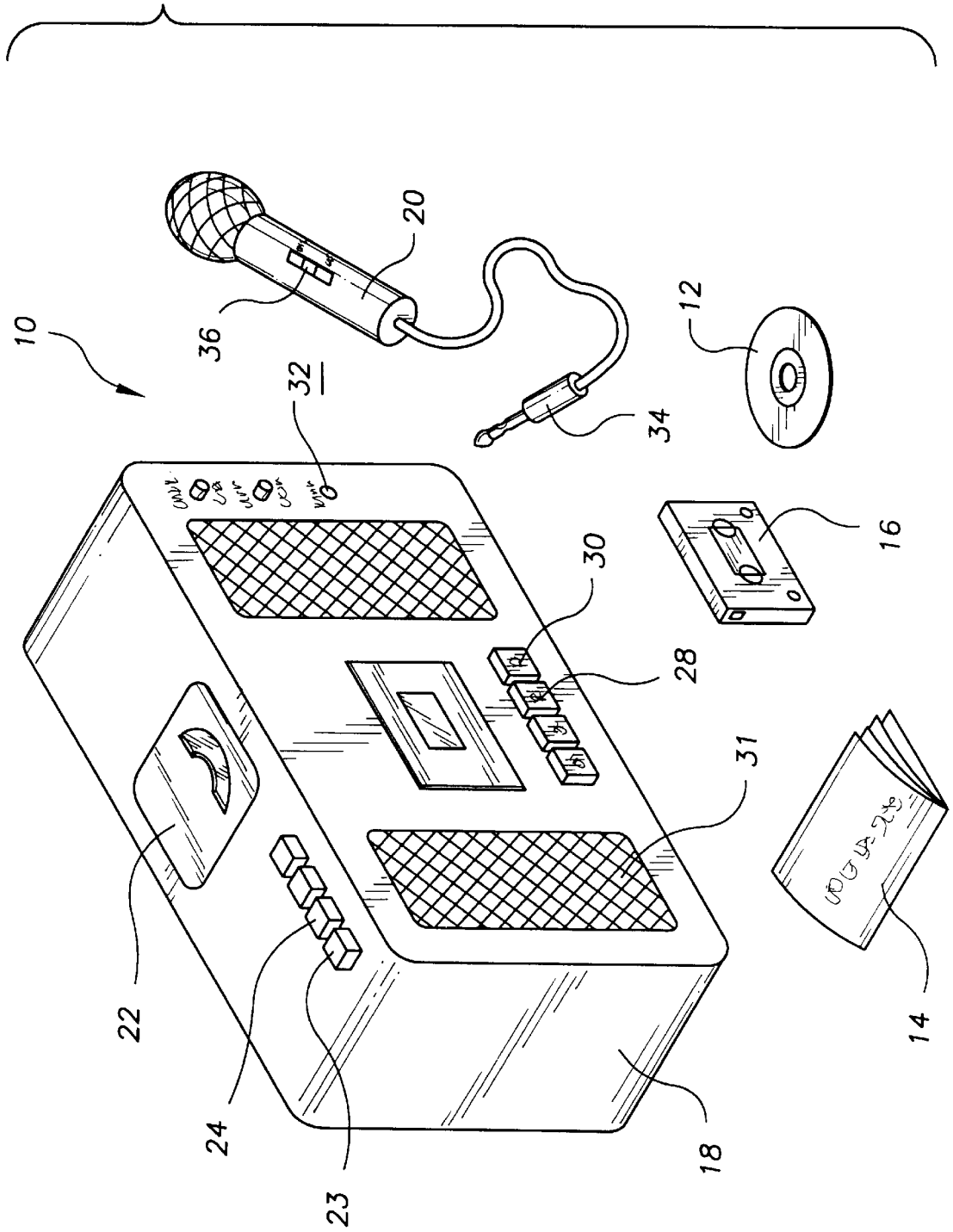
FIG. 1 is a perspective view of an exemplary embodiment of the voice-over instructional system of the present invention showing the instructional recording on compact disk having a plurality of completed works, each work including a first selection having an example section, preceded by a slate, as an example for the student to follow, and a second selection having a performance section consisting of a background-only track preceded by a slate; the script including director's notes for the student to follow; the audio cassette tape for recording the students performance; and the recording system having a compact disk player, an audio cassette tape recorder including a playback mechanism, and a microphone.

FIG. 1 shows an exemplary embodiment of the voice-over instructional system of the present invention, generally designated by the numeral 10. Instructional system 10 includes an instructional recording 12, a script booklet 14, an audio cassette tape 16, a recording system 18, and a microphone 20.

In this embodiment audio cassette tape 16, recording system 18, and microphone 20 are conventional off-the-shelf elements. Recording system 18 includes a compact disk player mechanisms 22 having play function key 23 and a repeat selection key 24; a cassette tape recording and playback mechanism 26 having a record function key 28 and a playback function key 30; and a microphone input jack 32. Microphone 20 has a plug 34 insertable into microphone input jack 32 and also includes an on/off switch 36.

In this embodiment, instructional recording 12 is recorded on conventional compact disk media in conventional format and includes twelve works. Each of the twelve works is divided into a first selection having an example section, preceded by a slate, and a second selection, immediately following the first selection and separated therefrom by an I.D. code, having a performance section consisting of a background-only track preceded by a slate. Instructional recording 12 is shown in isolation in FIG. 2.

Script booklet 14 is conventionally typeset and printed and includes the words and director's notes and instructions for performing the voice-over as intended.

Figure 2:
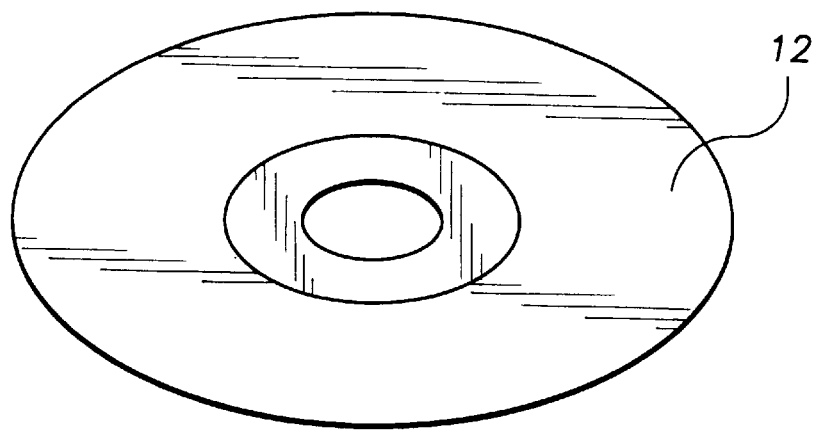
FIG. 2 is a perspective view of the instructional recording on compact disk.
Figure 3:
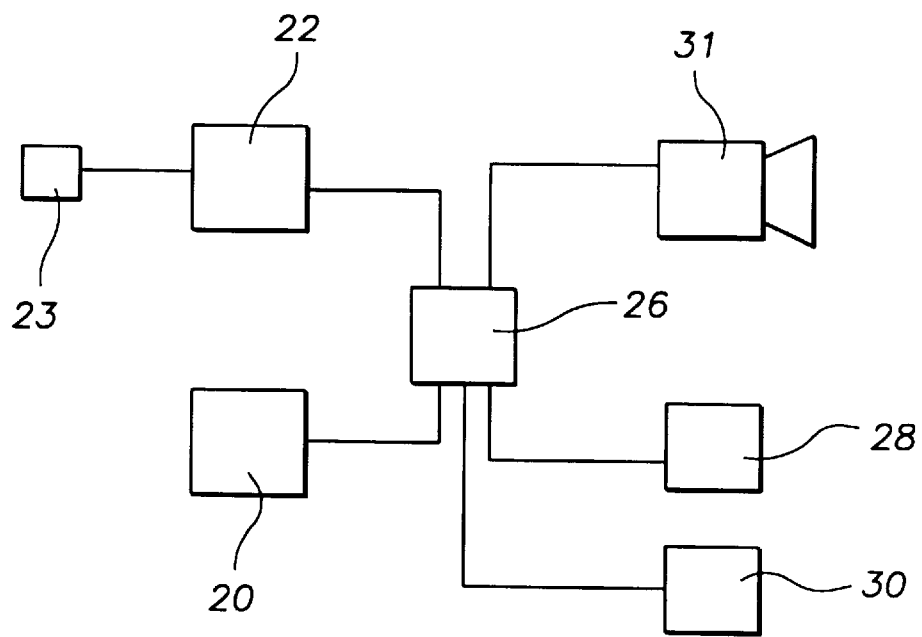
FIG. 3 is a schematic block diagram showing the functional relationship between the instructional recording, the audio cassette tape; and the recording system.

An exemplary embodiment of the method of voice-over instruction is now described with general reference to FIGS. 1–3. The exemplary method includes the steps 1) providing an instructional recording 12 as previously described; 2) providing a recording system 18 including a recording playback mechanism 22, an audio cassette tape recording mechanism 26 that is capable of recording simultaneously onto audio cassette 16 the recording played by playback mechanism 22 and the signal from microphone 20, and a microphone 20; 3) providing an audio cassette recording tape 16; 4) positioning instructional recording 12 into recording playback mechanism 22; 5) positioning audio cassette recording tape 16 into audio cassette recording mechanism 26; 6) activating recording playback mechanism 22 by depressing play function key 23 to play a selection from instructional recording 12; 7) providing a script 14 of each work included on instructional recording 12; 8) activating audio cassette recording mechanism 26 by depressing record function key 28; and 9) performing the script into microphone 20 while both audio cassette recording mechanism 26 and recording playback mechanism 22 are in operation. If desired the repeat function key 24 of recording playback mechanism 22 can be depressed to automatically repeat a selection from a work for repeated recording of the student's performance. Once the desired number of repetitions are performed, the student can rewind audio cassette tape 16 and depress the play key 30 of cassette recording mechanism 26 and here his/her performance through speakers 31 of recording system 18. The above steps are then repeated until the student is satisfied with his/her performance level.

It can be seen from the preceding description that a voice-over instructional system has been provided that allows a person to gain voice-over performance skills and confidence without the necessity of expensive instructors or access to expensive recording studios and equipment; that is inexpensive to produce; that includes at least one instructional recording having a plurality of completed works, each work including an example section for the student to follow and a performance section consisting of a background-only track for the student to play in conjunction with practicing the performance; that includes a mechanism for allowing the student to record his/her performance of the voice-over exercises to allow for self-critiquing of the performance by the student; and that includes scripts containing written instructions and notes to the performer about how the voice-over should be performed. It can also be seen from the preceding description that a method of voice-over instruction has been provided that is self-administered.

It is noted that the embodiment of the voice-over instructional system and method of voice-over instruction described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A voice-over instructional system comprising:

an instructional recording having a plurality of completed works, each completed work including an example section and a performance section; and a script including the words of said plurality of works and director's notes for each of said plurality of works;

said performance section follows said example section for each work on said instructional recording;

a recording system having a recording playback mechanism including an auto repeat selection function switch which when activated causes the same selection to repeat over and over again automatically until deactivated; a recording mechanism including a microphone that is capable of recording simultaneously from said recording playback mechanism and said microphone onto a recording medium;

said instructional recording being divided into separate works including a first selection that includes said example section, and a second selection, immediately following said first selection, including said performance section of said work.

* * * * *